(12) United States Patent
Heidenreich et al.

(10) Patent No.: US 8,562,701 B2
(45) Date of Patent: Oct. 22, 2013

(54) GASIFICATION APPARATUS AND METHOD FOR GENERATING SYNGAS FROM GASIFIABLE FEEDSTOCK MATERIAL

(75) Inventors: Steffen Heidenreich, Stimpfach (DE); Manfred Nacken, Heilbronn (DE); Pier Ugo Foscolo, Rome (IL); Sergio Rapagna, Folignano (IL)

(73) Assignee: Pall Corporation, Port Washington, NY (US)

( * ) Notice: Subject to any disclaimer, the term of this patent is extended or adjusted under 35 U.S.C. 154(b) by 750 days.

(21) Appl. No.: 12/598,508

(22) PCT Filed: Apr. 30, 2008

(86) PCT No.: PCT/EP2008/003523
§ 371 (c)(1),
(2), (4) Date: Apr. 20, 2010

(87) PCT Pub. No.: WO2008/135226
PCT Pub. Date: Nov. 13, 2008

(65) Prior Publication Data
US 2010/0223848 A1    Sep. 9, 2010

Related U.S. Application Data

(60) Provisional application No. 60/915,447, filed on May 2, 2007.

(51) Int. Cl.
*C01B 3/36* (2006.01)
(52) U.S. Cl.
USPC ........................................................ 48/197 R
(58) Field of Classification Search
None
See application file for complete search history.

(56) References Cited

U.S. PATENT DOCUMENTS

| | | | | |
|---|---|---|---|---|
| 3,429,656 A | * | 2/1969 | Sinfelt et al. | 423/213.2 |
| 5,925,156 A | * | 7/1999 | Motoki et al. | 55/487 |
| 6,863,868 B1 | * | 3/2005 | Alvin | 422/168 |
| 2004/0067175 A1 | | 4/2004 | Heidenreich et al. | |
| 2004/0182003 A1 | | 9/2004 | Bayle et al. | |
| 2005/0039400 A1 | | 2/2005 | Lau et al. | |

(Continued)

FOREIGN PATENT DOCUMENTS

| EP | 0 844 021 | 5/1998 |
|---|---|---|
| EP | 1 518 613 | 3/2005 |

(Continued)

OTHER PUBLICATIONS

Devi, L. et al., *Biomass and Bioenergy*, 24:125-140 (2003).

(Continued)

*Primary Examiner* — Imran Akram
(74) *Attorney, Agent, or Firm* — Leydig, Voit & Mayer, Ltd.

(57) ABSTRACT

The present invention relates to a gasification apparatus for generating syngas from gasifiable feedstock material, said apparatus comprising
a vessel having a feedstock inlet, an inlet for a gaseous gasifying medium, an outlet for exhausted feedstock material and a syngas outlet;
a gasifying reactor accommodated in said vessel and in fluid communication with said feedstock inlet, said outlet for exhausted feedstock material and said inlet for said gasifying medium of said vessel; and
a filtering unit accommodated in said vessel and having an upstream side and a downstream side, said upstream side of said filtering unit being in fluid communication with said reactor and said downstream side thereof being in fluid communication with said syngas outlet.

27 Claims, 6 Drawing Sheets

(56) References Cited

U.S. PATENT DOCUMENTS

Figure 1:
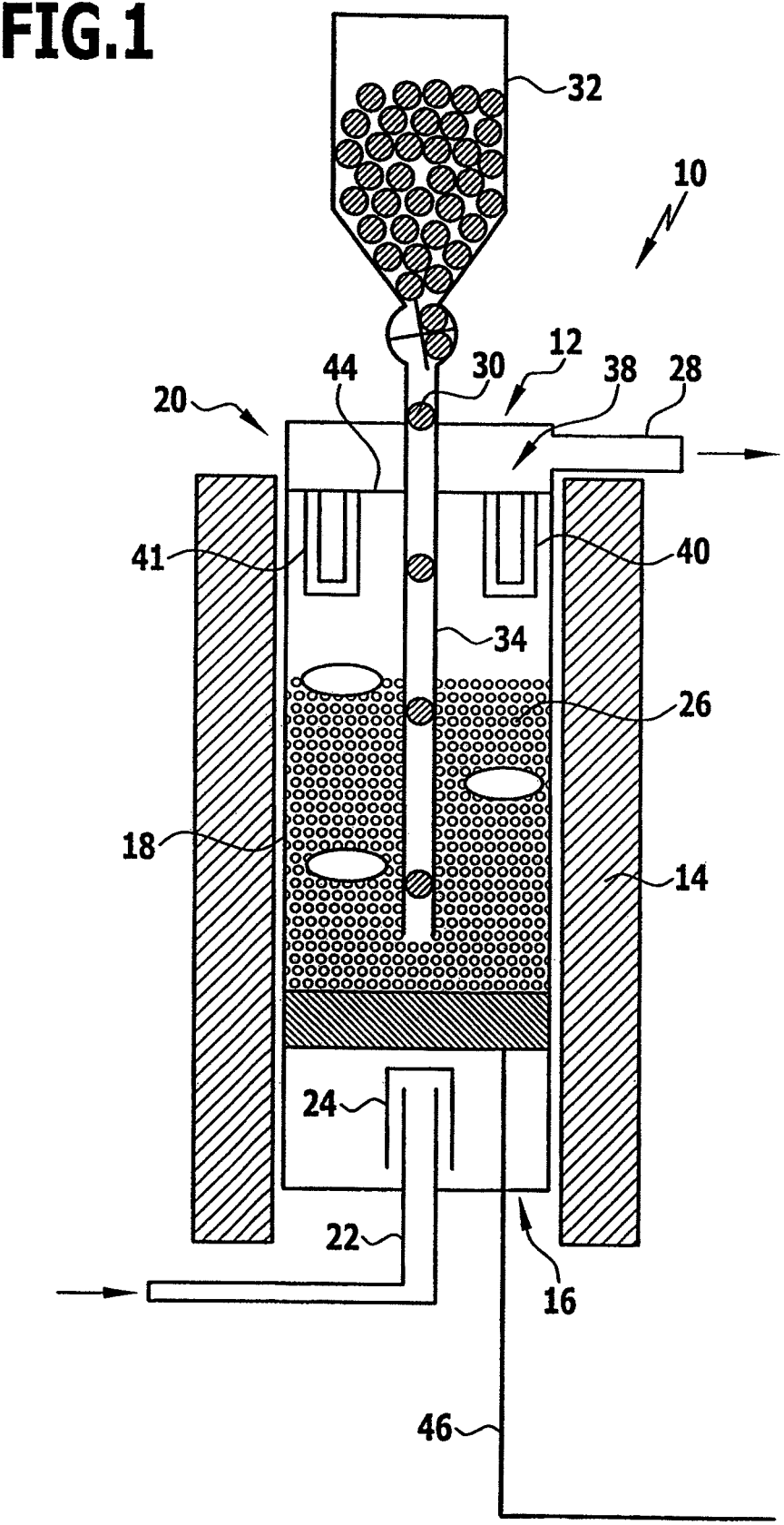

| | | |
|---|---|---|
| 2007/0031304 A1 | 2/2007 | Heidenreich et al. |
| 2007/0079554 A1 | 4/2007 | Schingnitz et al. |
| 2007/0094929 A1* | 5/2007 | Kang et al. .................... 48/111 |

FOREIGN PATENT DOCUMENTS

| | | |
|---|---|---|
| EP | 1 772 178 | 4/2007 |
| JP | 2002-192108 | 7/2002 |
| WO | WO 97/20017 | 6/1997 |
| WO | WO 00/11115 | 3/2000 |
| WO | WO 03/055577 | 7/2003 |

OTHER PUBLICATIONS

Nacken, M. et al., *Ind. Eng. Chem. Res.*, 46:1945-1951 (2007).

Rapagna, S. et al., *Biomass and Bioenergy*, 19:187-197 (2000).

\* cited by examiner

FIG.3
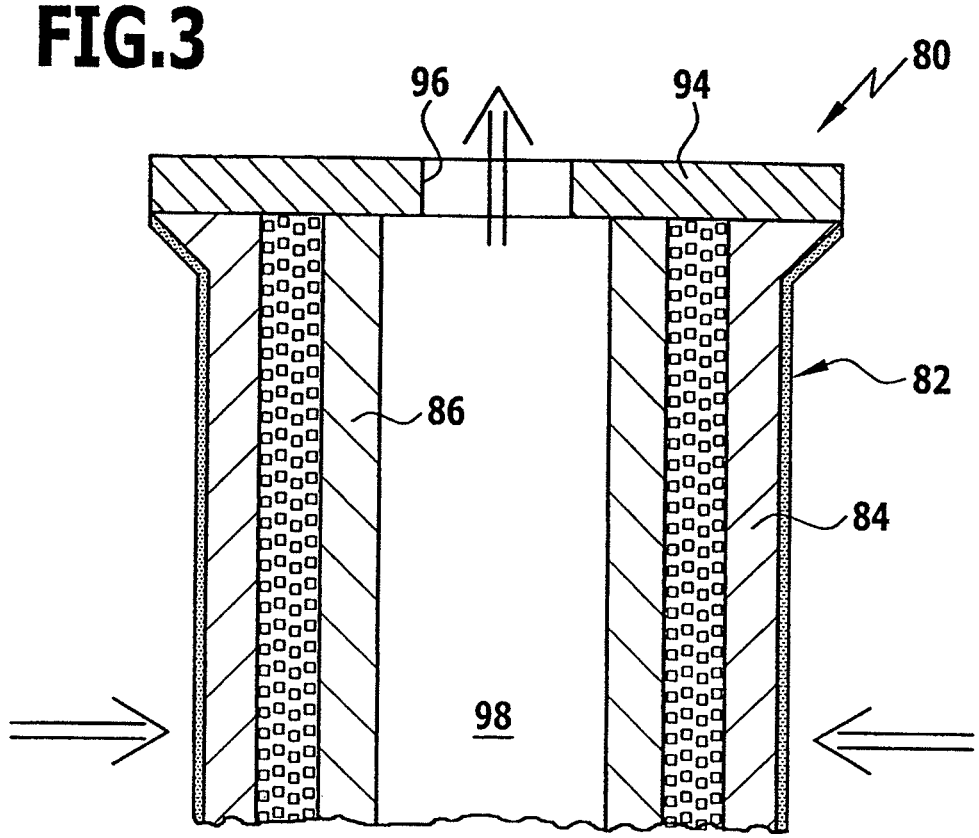
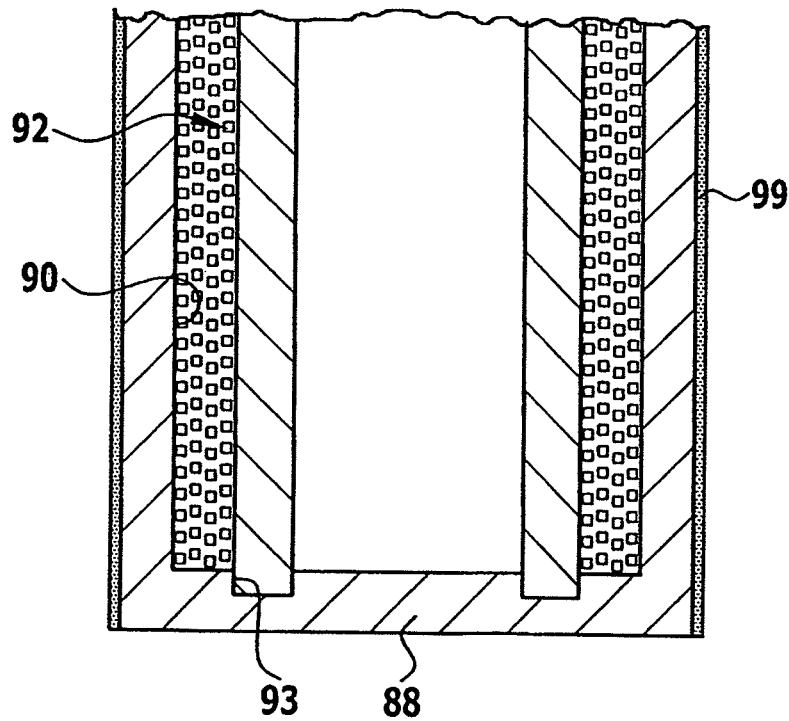

FIG.4
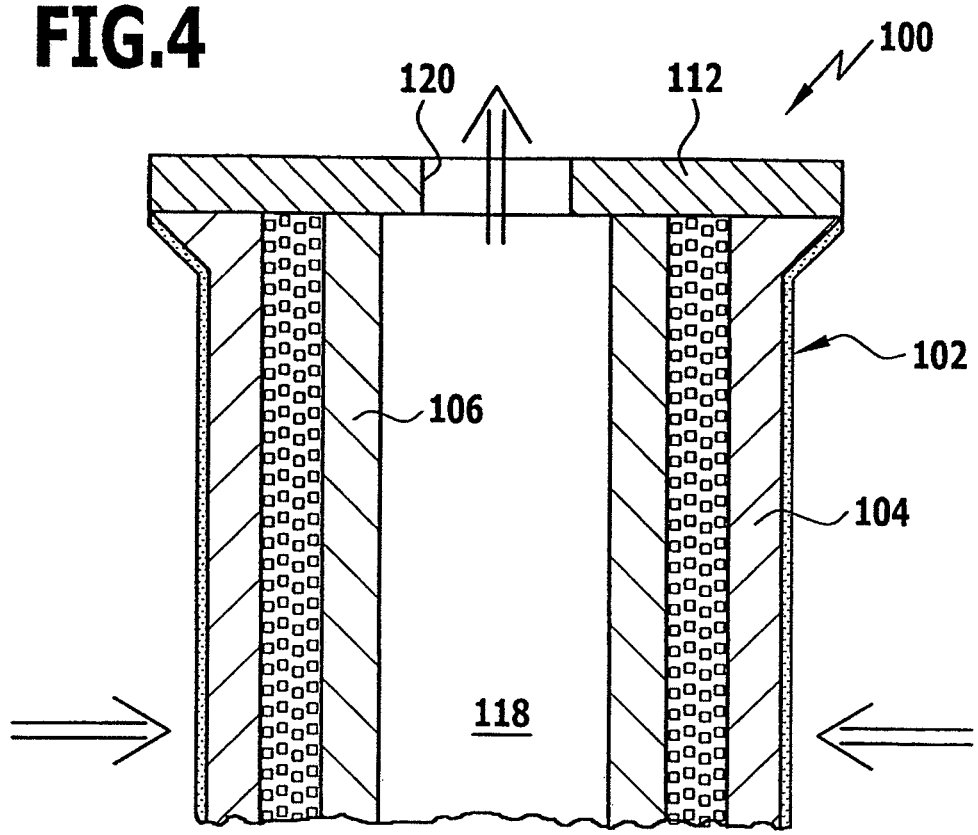
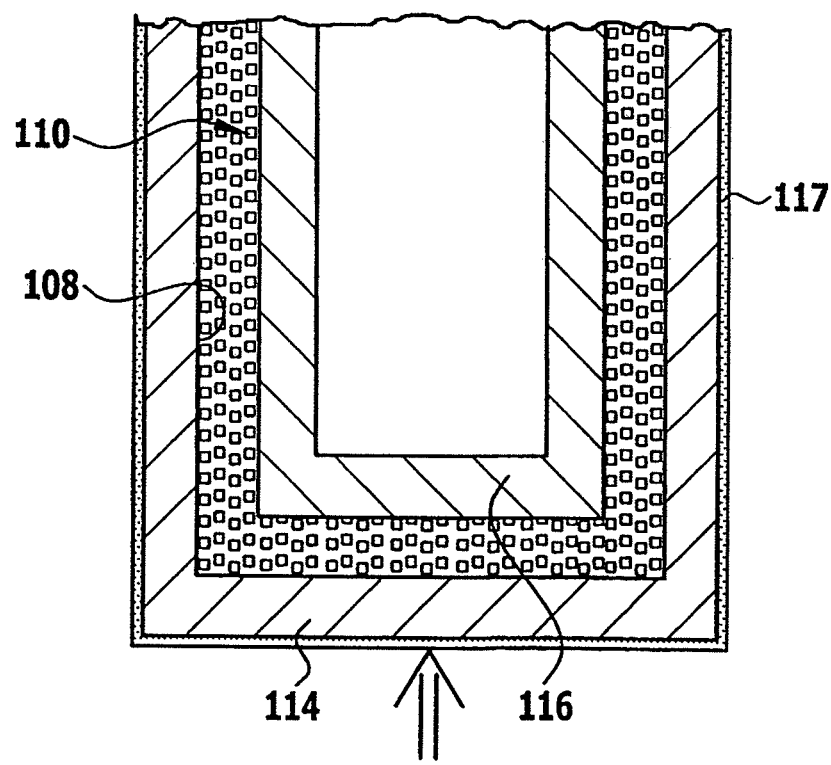

GASIFICATION APPARATUS AND METHOD FOR GENERATING SYNGAS FROM GASIFIABLE FEEDSTOCK MATERIAL

FIELD OF THE INVENTION

The present invention relates to a gasification apparatus and a method for generating syngas from a gasifiable feedstock material.

BACKGROUND OF THE INVENTION

Gasification apparatuses and methods for generating syngas have been found convenient to convert gasifiable feedstock material into a gaseous fuel by means of a high-temperature process. As a result of rather complex thermochemical reactions, gasifiable feedstock, e.g., biomass, is thus transformed into permanent gases such as hydrogen, carbon monoxide, carbon dioxide and methane which usually contain organic vapours which condense under ambient conditions and are known collectively as tar and a solid residue mainly consisting of char and ash.

Conventionally, the gasification process is carried out in a gasifying reactor accommodated in a vessel and the resulting crude permanent gases, in the following called crude syngas, are withdrawn from the vessel and passed through further equipment to remove solid residues as well as to reduce the tar components. The crude syngas contains the above-mentioned permanent gases hydrogen, carbon monoxide, carbon dioxide and methane in varying quantities, depending inter alia on the feedstock material used and on the conditions of the gasification process.

While the solid residues can be removed by a cyclone and eventually a further filtering device, removal of tar components is more difficult. Tar is undesirable because of various problems associated with condensation, formation of tar aerosols and polymerisation to form more complex structures which cause problems in the downstream process equipment as well as the engines and turbines used in applications of the gasification apparatus.

Several tar components condense and/or solidify when the temperature of the syngas drops below about 400° C. Therefore, process equipment which is likely to be affected by tar condensate has to be maintained at temperatures of about 500° C. or more.

Furthermore, the solids removed from the crude syngas and tar still contain gasifiable material.

Various techniques have been proposed in order to recover at least part of the energy contained in the solids removed from the crude syngas and the tar components.

However, such approaches are not satisfying in that still a substantial portion of tar components is contained in the crude syngas removed from the vessel containing the gasifying reactor which creates problems in the following equipment and reduces the yield of syngas. Furthermore, high temperature processing of the crude syngas is required until it has passed the filtering device.

Furthermore, recycling of the solid particulate matter including not yet exhausted, i.e., still gasifiable portions of the feedstock material requires a more complex apparatus and higher maintenance efforts.

The object of the present invention therefore resides in providing an apparatus and a method for generating syngas from gasifiable feedstock material which allows for a higher yield of syngas with reduced costs and efforts.

SUMMARY OF THE INVENTION

The above object of the present invention is solved with a gasification apparatus according to claim 1.

Accommodating the filtering unit within the same vessel which also accommodates the gasifying reactor provides a purified syngas at the outlet of the vessel without the need of having a cyclone device and an additional filtering device attached to the apparatus.

This is of specific importance and impact, since heretofore the crude syngas withdrawn from the vessel is at a high temperature and needs to be kept at a high temperature when passing through the cyclone and filtering device, because otherwise the tar components would condense and impair the function of the cyclone and the subsequent filtering device.

Not only must this downstream equipment, namely the cyclone and the filtering device, withstand such high temperatures, but it may even be necessary to at least isolate the conduits leading from the vessel to the cyclone and to the subsequent filtering device or, in some cases, even to heat the cyclone and the filtering device in order to maintain the crude syngas stream exiting from the vessel and passing through the cyclone and filtering device at a temperature high enough, i.e., at 500° C. or above, to avoid condensation of tar and deposition of the same, e.g., in the filter element, which would rather soon lead to a clogging of the filtering device.

Accommodating the filtering unit within the same vessel which also accommodates the gasifying reactor does not require higher investments or more costly filter elements since the filter elements previously used in the separate filtering device subsequent to a cyclone already had to withstand similar high temperatures.

Therefore, the same type of filter elements can be used in the filtering unit accommodated in the vessel. At the same time, these filter elements remove solids from the crude syngas which may be immediately returned into the reactor for further gasification without extra tubing and additional apparatus for recycling the solids removed from the crude syngas. Surprisingly, it has been found out that a cyclone device can be omitted.

It is therefore preferred that the upstream side of the filtering unit being in direct fluid communication with the downstream side of the reactor without having other equipment in between.

In case the filtering unit and the reactor are disposed in a vertical arrangement of the filtering unit above the gasifying reactor, the solids removed from the crude syngas may simply be recycled by gravity into the gasifying reactor without the need of any further equipment.

Preferred filtering units include one or more filter elements, especially replaceable filter elements, which facilitates maintenance of the gasification apparatus.

Filter elements which are of specific advantage according to the present invention are in the form of filter candles which provide a large surface within a limited volume and which are easy to handle.

Preferably, these filter elements comprise a porous support element.

According to a specific embodiment of the present invention said porous support element comprises a porous outer wall element and a porous inner wall element, said porous inner wall element defining a filtrate chamber which is in fluid communication with the downstream side of the filtering unit.

In another embodiment of the present invention said porous outer and inner wall elements are spaced apart from each other thereby defining a free space. The filter element further comprises a particulate catalyst material in bulk, and said particulate catalyst material is accommodated within said free space.

In still another embodiment of the present invention said porous inner wall element comprises a catalyst material. In such an embodiment the outer and inner wall elements are preferably not spaced apart from one another but are arranged in close contact with their inner and outer peripheral surfaces, respectively.

Preferably, said inner wall elements consists of a catalyst material or of a material that is coated with a catalyst material.

Furthermore, the porous support element may comprise a membrane on the upstream side, defining the filtration characteristic of the filter elements. The use of a membrane layer on the upstream surface of the support element provides for more flexibility as to the design of the porosity of the support element. The delta p characteristic of the support element and of the filter element as a whole may be more easily adjusted to the requirements of a specific application.

Preferably, the support element comprises a basic metal oxide material or a mixed metal oxide material which is of specific interest as a carrier for catalytic materials.

More preferably, the filter elements comprise a catalytically active metal material, said catalytically active metal material being preferably deposited on said basic metal oxide material or a mixed metal oxide material.

Preferred examples of catalytically active metal material are Ni, Fe, Ru, Pd, Pt, Rh, Ir and Re in elemental or oxide form. The afore-mentioned metal materials may be used each one alone or in combination with one another.

Once the filter elements comprise a catalytically active metal material, at least substantive portions of the tar components may be subjected to catalytic reforming to yield syngas.

Thus, catalytic reforming of the tar components not only reduces problems in the downstream equipment caused by tar condensation, but also increases the syngas yield. Furthermore, the syngas quality is increased, since the proportions of combustible gas components within the syngas like $H_2$ and methane is increased.

Since the filtering unit is accommodated in the vessel which also accommodates the gasifying reactor, the filtering unit is maintained at a temperature sufficient for the catalytic reforming process without the need of heating the unit.

In a preferred embodiment of the present invention, the vessel comprises a bottom portion, an upper end portion and a side wall connecting said bottom and upper end portions.

It is preferred that the bottom portion and/or the side wall include one or more inlets for that gasifying medium.

Also in a preferred embodiment, the side wall comprises a feedstock material inlet.

Such feedstock material inlet is preferably located at a portion of the side wall which corresponds to a lower portion of the gasifying reactor. The side wall then preferably forms part of the gasifying reactor itself.

In another preferred embodiment, the upper portion of the vessel accommodates the filtering unit and the syngas outlet.

In such a configuration, the gasifying medium is preferably introduced into the lower portion of the vessel, either through the bottom portion and/or the lower side wall of the vessel, and passes through the gasifying reactor, where it supports the gasifying reaction of the feedstock material. The gas flow within the vessel continues up to the upper portion where the crude syngas generated in the reactor passes through the filtering unit prior to exiting the vessel through the syngas outlet in purified form.

While the present invention is not limited to a specific type of gasifying reactor, fluidised bed reactors are preferred.

Typical examples of fluidised bed reactors described in the art which are useful among others within the scope of the present invention are known from EP 0 844 021, WO 97/20017 and US 2007/0079554.

In a preferred embodiment of the present invention, the fluidised bed of the gasifying reactor comprises a particulate matter selected from sand, olivine and/or dolomite.

The bed material serves as a heat source, heat reservoir and heat transfer means for the freshly fed gasifiable feedstock material which may be fed into the gasification apparatus without being pre-heated. The heat transfer from the bed material to the freshly fed feedstock accelerates the heating of the feedstock to the desired reaction temperature.

The use of particulate matter other than sand, e.g., olivine and/or dolomite, may have additional advantages in that those materials may support tar decomposition reactions.

This already reduces the tar content in the crude gas to some extent which then is more easily and more completely converted to syngas in the filtering unit carrying a catalytic active metal material.

In a further preferred embodiment, the vessel comprises an inlet for a sorbent material. Sorbent materials may be used for binding of noxious gases like $H_2S$, HCl, heavy metal components, alkaline compounds and the like such that they do not form part of the crude syngas exiting the gasifying reactor.

Additionally or in the alternative, the sorbent may be included in the feedstock material and fed into the gasification apparatus together with the gasifiable feedstock material.

Additionally or in another alternative, the inlet for sorbent material may be in fluid communication with the reactor such that the sorbent material may be fed into the reactor via a separate inlet.

Additionally or in the alternative, the inlet of the sorbent material may be located in the side wall of the vessel or in the upper end portion of the vessel, still on the upstream side of the filtering unit.

The present invention further resides in a method for generating syngas from gasifiable feedstock material.

The method according to the present invention makes use of a gasification apparatus as described above and is defined in detail in claim 24.

In a number of cases, it is preferred to use a gasifying medium which is a combustion supporting gas. The use of a combustion supporting gas as a gasifying medium is advantageous in that it allows to burn part of the feedstock material, thereby creating energy needed for the gasifying reaction. In many cases, the use of combustion supporting gas allows the creation of sufficient energy in the reactor to sustain the gasifying reaction without having the need of heating the vessel by external heating means, e.g. an electric furnace.

Preferred gasifying media comprise oxygen, carbon dioxide, nitrogen and/or water vapour. It is especially noted that air as a mixture of oxygen and nitrogen may be used as a gasifying medium.

In some cases, water vapour alone may be used as a gasifying medium. Then, however, external heating means are necessary to maintain the vessel and the reactor inside the vessel at a temperature high enough for the gasifying reaction.

Nitrogen can be used as a gaseous component to enhance fluidity of the feedstock material in the reactor.

Preferably, the feedstock material is used in the form of a particulate matter which allows simple and controlled feeding into the vessel.

The feedstock material to be used in the present inventive method may be derived from many sources and will include preferably biomass, especially cellulose-containing materials.

Alternatively or additionally, the feedstock may comprise dried sewage sludge which may comprise consist of non-cellulosic biomass materials.

The gasifying medium may be fed into the vessel through one or more gasifying medium inlets, the inlets being located in the bottom portion and/or the side wall of the vessel. By selecting one or more inlets for feeding the gasifying medium into the vessel optimum operating conditions for the gasifying reactor can be obtained.

Usually, the side walls from the vessel will form part of the gasifying reactor, i.e., it is not necessary to have a separate compartment installed within the vessel for defining the gasifying reactor.

Preferably, the purified syngas is removed from the vessel through the syngas outlet which is located in the upper portion of the vessel. The upper portion of the vessel preferably also accommodates the filtering unit which is preferably provided with one or more filter elements.

Preferable filter elements to be used in connection with the present invention are in the form of filter candles. The filter elements useful in the present invention have been described above in connection with the description of the inventive apparatus.

The catalytically active material which may form part of the filter elements is preferably selected from catalytically active metal material which promotes catalytical reforming of organic compounds contained in the crude syngas.

Such organic compounds include, but are not limited to, gaseous hydrocarbons, especially heavy hydrocarbons, and other tar components.

In an even more preferred method according to the present invention, the catalytically active metal material is selected to also promote decomposition of ammonia which is created in cases where the feedstock material includes proteinaceous material and/or nitrates, and ammonia as part of the syngas is usually unwanted.

In another preferred method according to the present invention, the method comprises feeding of a sorbent material into the reactor. The sorbent material is designed to bind noxious gases like $H_2S$, HCl, heavy metals and/or alkaline compounds which are mostly unwanted in the purified syngas exiting the vessel.

The sorbent material can be introduced into the vessel in a portion accommodating the gasifying reactor and alternatively or in addition upstream of the filtering unit.

The sorbent material is preferably selected from dolomite, lime and/or trona.

While the present invention may be carried out as a batch process, most advantageously the present inventive method is carried out as a continuous process.

Exhausted particulate feedstock material is withdrawn from said reactor continuously or intermittently, thus allowing the method to continue for an extended period of time allowing for large service intervals.

Most advantageously, the present invention allows that during carrying out the method, the ash component removed from the crude syngas by the filtering unit may be directly returned into the reactor for further gasification, the above and further advantages of the present invention will be apparent from the following description of an example and the Figures.

SHORT DESCRIPTION OF THE FIGURES

In the Figures represent

Figure 2:
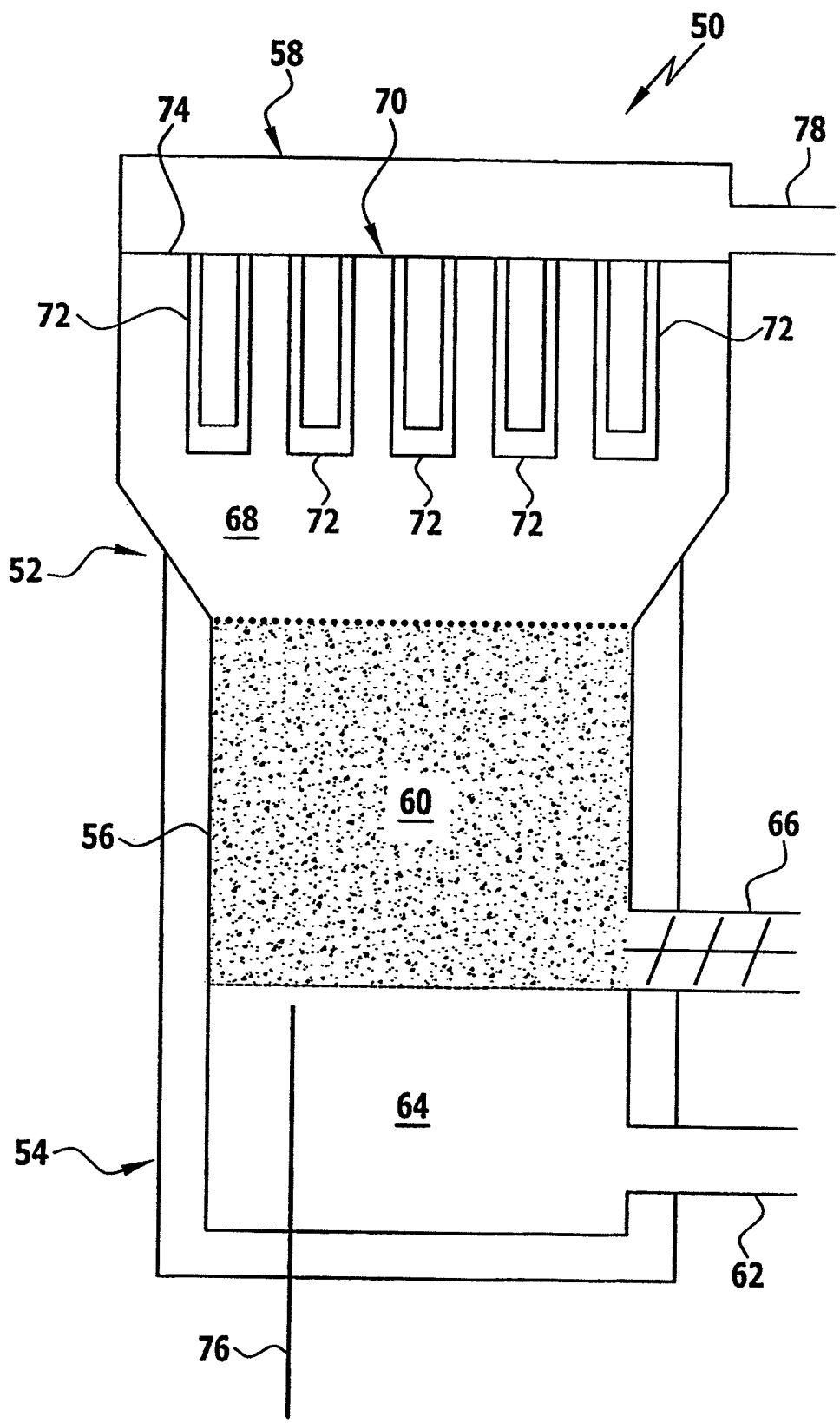
Figure 5:
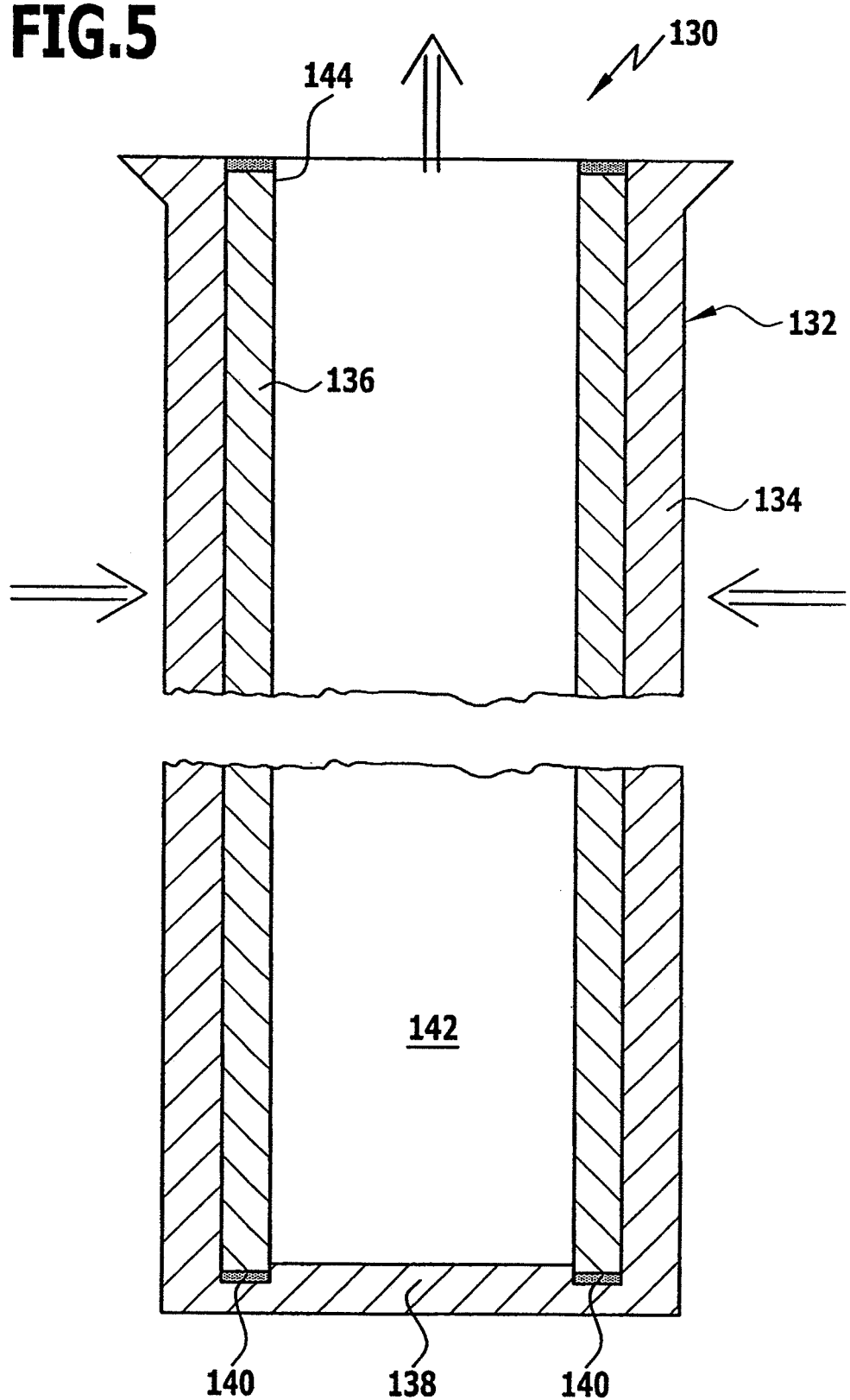
Figure 6:
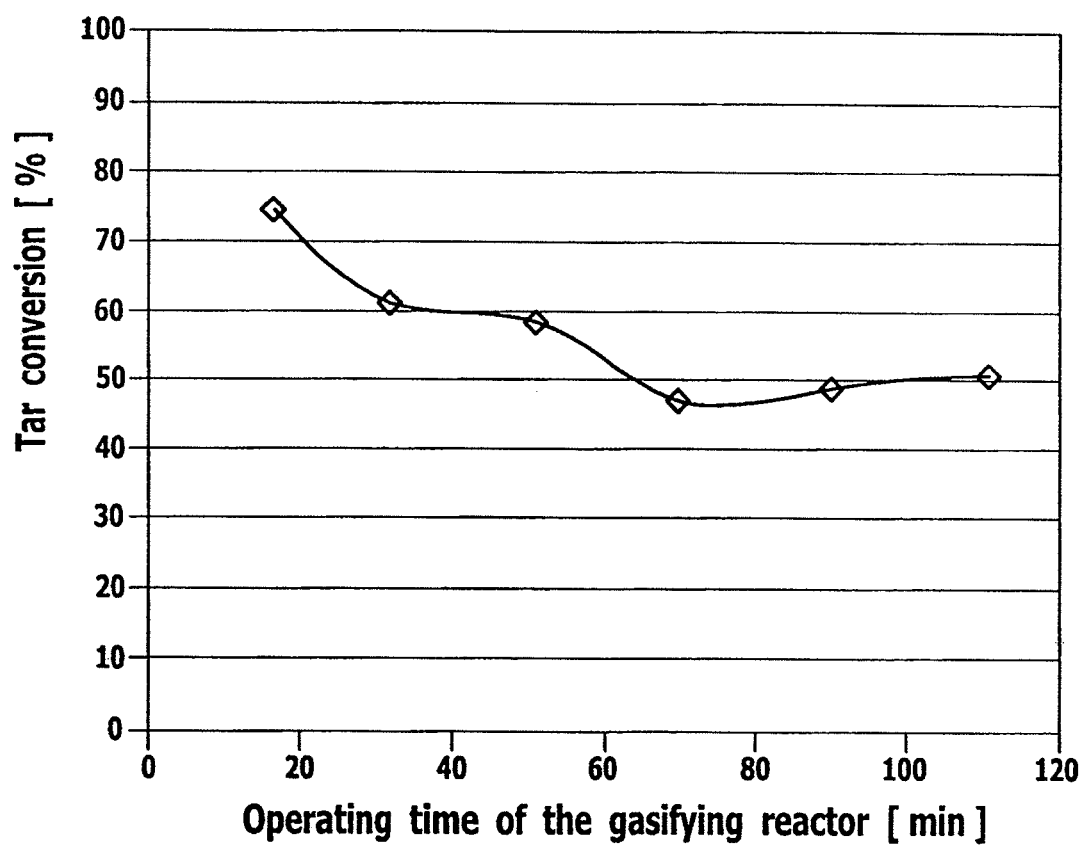

FIG. 1 a schematic representation of an inventive gasification apparatus;

FIG. 2 a schematic representation of a further embodiment of an inventive gasification apparatus;

FIG. 3 a schematic representation of a cross section of a first embodiment of a filter element to be used in the apparatuses of FIGS. 1 and 2;

FIG. 4 a schematic representation of a cross section of a second embodiment of a filter element to be used in the apparatuses of FIGS. 1 and 2;

FIG. 5 a schematic representation of a cross section of a third embodiment of a filter element to be used in the apparatuses of FIGS. 1 and 2; and FIG. 6 an exemplary graph indicating tar reduction obtained in the inventive Example.

DETAILED DESCRIPTION OF THE INVENTION

FIG. 1 shows a gasification apparatus 10 for gasification of a feedstock material, said gasification apparatus 10 comprising a vessel 12 surrounded by an electric furnace 14.

The vessel 12 comprises a bottom portion 16, a side wall 18 and an upper end portion 20.

The bottom portion 16 of the vessel 12 comprises an inlet 22 for a gasification medium, e.g., steam, and a gasification medium distributing means 24 accommodated within vessel 12. The side wall 18 of the vessel 12 accommodates a gasification reactor 26 which is of the type of a bubbling fluidised bed reactor.

The upper end portion 20 of vessel 12 comprises a syngas outlet 28 and a feed inlet 30 for a gasifyable feedstock material 32. The feedstock material 32 is directed through inlet 30 and a conduit 34 within housing 12 into the reactor 26 and its fluid bed. The upper end portion of vessel 12 accommodates a filtering unit 38 comprising two filter elements 40, 41 which are mounted in a separation plate 44 which delimits a freeboard space above reactor 26 from a volume downstream of the filtering unit 38 and in direct fluid connection with syngas outlet 28.

Exhausted feedstock material may be withdrawn from vessel 12 via an outlet 46 through the bottom portion of vessel 12.

An apparatus similar to the one shown in FIG. 1 has been used in the following Example.

FIG. 2 represents another type of a gasification apparatus 50 according to the present invention.

The gasification apparatus 50 comprises a vessel 52 having a bottom portion 54, a side wall 56 and an upper end portion 58. The vessel 52 accommodates within its side wall 56a gasifying reactor 60.

In this embodiment the gasifying reactor 60 is of the fluidized bed reactor type.

The bottom portion 54 includes an inlet 62 for a gasfying medium and a plenum 64 for distribution of the gasifying medium over the whole cross section of vessel 52.

The vessel further comprises an inlet 66 for a gasifiable feedstock material, said inlet being in fluid communication with the reactor 60.

The upper end portion 58 of vessel 52 provides a freeboard 68 which accommodates a filtering unit 70 comprising a plurality of filter elements 72 mounted in a separation plate 74 which divides the freeboard 68 into a section upstream of the filtering unit 70 which is in direct fluid communication with the downstream end of the reactor 60 and a section downstream of the filtering unit 70 which is in direct fluid communication with a syngas outlet 78 of the vessel 52.

The operation of the gasifying apparatus 50 is similar to the operation of gasifying apparatus 10 of FIG. 1.

Exhausted feedstock material may be withdrawn from vessel 52 via outlet line 76.

FIG. 3 shows a preferred example of a filter element for use in the gasification apparatuses 10 and 50 as shown in FIGS. 1 and 2, respectively.

The filter element 80 consists of a porous support element 82 which is comprised of a porous outer wall element 84 and a porous inner wall element 86 which are essentially coextensive over the length of the filter element 80.

Filter element 80 may have, for example, a circular cross section, the porous outer and inner wall elements 84, 86 being of hollow cylindrical shape and arranged coaxially.

Filter element 80 comprises a bottom portion 88 which is made of an essentially fluid impervious material. The outer wall element 84 and the inner wall element 86 are spaced from one another and define in between them a free space 90 which accommodates a particulate catalytic material 92 in bulk. The lower edge of the inner wall element is sealingly accommodated in a recess 93 of bottom portion 88.

The upper portion of the filter element 80 is provided with a top plate 94 which accommodates the upper ends of the inner and outer wall elements and seals off the space 90 accommodating the catalytic material.

Top plate 94 comprises a central opening 96 which provides a fluid communication of the filtrate chamber 98 defined by the inner surface of the inner wall element 86 with the downstream side of the filtering unit.

On the upstream side of filter element 80 the support element 82 comprises a membrane layer 99 the pores of which defining the filtration characteristic of the filter element 80. The porosity of the porous outer and inner wall elements can then be varied in broad ranges. The pores or perforation of these wall elements may be made relatively large, since the maximum size of the pores or perforations must only be small enough to retain the particles of the bulk material 92 within the free space 90.

This feature especially allows to reduce the delta p over the filter element to a considerable extent.

No membrane layer is needed at the bottom portion 88 since it is made of fluid impervious material.

A similar embodiment of a filter element to be used in connection with the inventive apparatus is shown in FIG. 4 in the form of filter element 100.

Filter element 100 comprises a porous support element 102 which is comprised of a porous outer wall element 104 and a porous inner wall element 106. As described already in connection with the embodiment of the filter element 80 in connection with FIG. 3, the outer and inner wall elements are spaced apart from one another creating a free space 108 accommodating a particulate catalytic material 110 in bulk. The upper end of the filter element 100 is closed by a top plate 112, similar to the plate 94 of the filter element 80 shown in FIG. 3.

The lower end of filter element 100, however, differs from the configuration shown for the filter element 80 in FIG. 3. Here, the bottom wall 114 is made of a porous material. The inner wall element 106 also includes a porous bottom wall 116, and the bottom wall 116 and the bottom wall 114 are spaced from one another so as to contribute to the free space 110 to accommodate particulate catalytic material in bulk.

This embodiment of the filter element 100 makes maximum use of the volume occupied for providing free space for particulate catalytic material 110 and also provides a maximum surface area for fluid passing through into the interior where it is collected in a filtrate space 118. The top plate 112 has a central opening 120 which provides for a fluid communication of the filtrate space 118 and the downstream side of the filtering unit.

As has been discussed in connection with the filter element shown in FIG. 3, the filter element 100 has on the upstream surface of its support element 102 a membrane layer 117. Since the bottom walls 114 and 116 are porous and pervious to fluid, the membrane layer 117 also covers the upstream surface of bottom wall 114.

FIG. 5 shows an alternative embodiment for a filter element to be used in an apparatus of the present invention, e.g., in any one of the gasification apparatuses 10 and 50, respectively.

Filter element 130 as shown in FIG. 5 comprises a porous support element 132 which is comprised of a porous outer wall element 134 and a porous inner wall element 136. The bottom part of the filter element 130 is closed off by the fluid impervious bottom plate 138 which accommodates in a recess the lower ends 140 of the porous inner wall element 136. The porous inner wall element constitutes with its inner surface a filtrate chamber 142.

In contrast to the embodiments shown in FIGS. 3 and 4, the filter element 130 shown in FIG. 5 comprises a porous inner wall element made of a catalyst material or made of a material which supports a catalyst material. Since the porous inner wall element 136 provides for the catalytic activity itself, there is no need to provide a free space between the inner wall element and the outer wall element, and indeed, it is preferred that the inner wall element 136 closely contacts the outer wall element 134.

At its upper end, the inner wall element 136 is sealed to the upper end of the outer wall element 134 such that a top plate may be omitted.

The filtrate space 142 is in fluid communication with the downstream side of the filtering unit via the open end 144 of the filter element 130.

It is readily appreciated that the filter element 130 of FIG. 5 can be modified in order to provide an inner wall element 136 with a bottom part which then would allow that the bottom part 138 be of porous, i.e., pervious nature.

Furthermore, it is readily conceivable that the porosity of the outer wall element may be selected such as to provide the desired filtration characteristic.

In the alternative, a membrane layer (not shown) may be provided on the upstream surface of the support element 132 which then provides the required filtration properties to the filter element 130. The porosity of the outer (and inner) wall element may be selected such as to minimize delta p and provide a maximum effect for the catalytic activity of the catalyst material provided with the inner wall element 136.

EXAMPLE

In the present Example an apparatus similar to apparatus 10 of FIG. 1 has been used. The filtering unit comprised a filter element comprising a porous SiC support element provided with a MgO—$Al_2O_3$ coating and a NiO catalyst deposited thereon. The filter element was of the dimensions 60/40 mm (outer/inner diameter)×368 mm (length) corresponding to an effective filtration surface of 0.06937 $m^2$ and was accommodated in the upper end portion of a vessel, i.e., in the freeboard of a bubbling fluidized-bed gasifying reactor similar to the one shown in FIG. 1. On its upstream surface, the filter element was equipped with a membrane having an average pore size of about 10 μm.

Thus the filter element had a simpler structure as compared to the filter elements described in connection with FIGS. 3 through 5.

Almond shells were used as biomass feedstock material and olivine in particulate form was used as bed material.

The gasification process was carried out as a steam gasification process.

Before starting the steam gasification of the biomass the gasifying reactor and the catalytic filtering unit were heated up to about 800° C. by means of an electric furnice (FIG. 1). For reduction of the NiO containing catalyst material of the catalytic filter element a $N_2$—$H_2$ gas mixture with an $H_2$ content of 3.5 vol %/0 was used. After complete reduction of the catalytic filter element feeding of the $H_2$ gas was terminated and the steam gasification was started with a biomass feeding rate of 8.43 g/min. The steam feeding rate was adjusted to 5.3 g/min during the first 60 min of the gasification process selecting a face velocity for the catalytic filter element of 1.7 cm/s. In the second hour of the 120 min lasting gasification experiment the steam feeding rate was increased to 8 g/min to result in a face velocity of 2 cm/s. The nitrogen feed rate has been fixed at 5.7 l/min at 20° C. during the whole steam gasification process.

Further details to the operating conditions of the gasifier, the gas yield, the water conversion, tar content in the purified syngas after passing the catalytic filter element, the char residue and carbon conversion as well as the composition of the purified syngas are given in Table 1.

For the determination of the tar removal performance of the catalytic filter element a second experiment under comparable steam gasification conditions with an integrated non-catalytic filter candle of the same geometry was performed. Table 2 shows the corresponding gas yield, water conversion, tar content and composition of the crude syngas, the char residue and carbon conversion. Similar tar residues are observed in conventional gasification systems.

TABLE 1

Steam gasification of almond shells with olivine bed inventory

| | Operating time [min] | | | | | |
|---|---|---|---|---|---|---|
| | 17 | 32 | 51 | 70 | 90 | 110 |
| Reactor outlet temperature [° C.] | 706 | 701 | 704 | 714 | 717 | 715 |
| Face velocity [cm/s] | 1.7 | 1.7 | 1.7 | 2 | 2 | 2 |
| Gasifier bed temperature [° C.] | 868 | 873 | 885 | 895 | 890 | 885 |
| Steam/biomass dry | 0.77 | 0.77 | 0.77 | 1.11 | 1.11 | 1.11 |
| Water conversion [%] | 45.4 | 40.8 | 43.1 | 36.2 | 32.6 | 29.4 |
| Gas yield, $Nm^3$ dry/kg daf | 1.85 | 1.67 | 1.61 | 1.72 | 1.76 | 1.76 |
| Tar content, $mg/Nm^3$ dry | 266 | 406 | 434 | 555 | 538 | 515 |
| Char residue, g/kg daf | 77.9 | 77.9 | 77.9 | 77.9 | 77.9 | 77.9 |
| Carbon conversion [%] | 85.1 | 83.0 | 84.4 | 87.1 | 88.4 | 87.8 |
| $H_2$ [vol % dry gas, $N_2$ free] | 55.5 | 52.1 | 49.4 | 51.1 | 51.5 | 51.8 |
| CO [vol % dry gas, $N_2$ free] | 26.8 | 27.0 | 27.2 | 23.7 | 23.1 | 22.5 |
| $CO_2$ [vol % dry gas, $N_2$ free] | 15.7 | 16.7 | 17.4 | 19.5 | 19.8 | 20.1 |
| $CH_4$ [vol % dry gas, $N_2$ free] | 1.9 | 4.3 | 6.0 | 5.7 | 5.6 | 5.6 |

For the determination of the tar removal performance of the catalytic filter element a second experiment under comparable steam gasification conditions with an integrated non-catalytic filter candle of the same geometry was performed. Table 2 shows the corresponding gas yield, water conversion, tar content and composition of the crude syngas, the char residue and carbon conversion. Similar tar residues are observed in conventional gasification systems.

TABLE 2

Steam gasification test

| Reactor configuration | Non-catalytic filter in the gasifier |
|---|---|
| Biomass in [g/min] | 8.48 |
| Steam inlet [g/min] | 8.37 |
| Nitrogen inlet [l/min at 20° C.] | 5.6 |
| Gasifier bed temperature [° C.] | 840.00 |
| Reactor outlet temperature [° C.] | 720 |
| Steam/biomass dry (S/B) | 1.16 |
| Water conversion [%] | 22 |
| Gas yield, $Nm^3$ dry, $N_2$ free/kg daf | 1.39 |
| Tar content, $g/Nm^3$ dry | 1.04 |
| Char residue, g/kg daf | 85.71 |
| Carbon conversion into gas [%] | 77.65 |
| $H_2$ [vol % dry gas, $N_2$ free] | 44.00 |
| CO [vol % dry gas, $N_2$ free] | 26.00 |
| $CO_2$ [vol % dry gas, $N_2$ free] | 20.00 |
| $CH_4$ [vol % dry gas, $N_2$ free] | 8.00 |

For the calculation of the tar conversions (in percent) of the catalytic filter element achieved in the first gasification experiment, the difference between the initial tar content of 1.04 $g/Nm^3$ (measured in the second gasification experiment) and the measured tar content at each distinct operating time of the first gasification experiment is divided by the initial tar content of 1.04 $g/Nm^3$.

The resulting tar conversions of the catalytic filter element in the first gasification experiment according to the conditions of Table 1 by increasing the face velocity after 60 min operating time from 1.7 to 2 cm/s are given in FIG. 6.

The invention claimed is:

1. A method for generating syngas from gasifiable feedstock material comprising
   feeding a feedstock material into a gasification apparatus, the apparatus comprising
   a vessel having a feedstock inlet, an inlet for a gaseous gasifying medium, an outlet for exhausted feedstock material and a syngas outlet;
   a gasifying reactor accommodated in the vessel and in fluid communication with the feedstock inlet, the outlet for exhausted feedstock material and the inlet for the gasifying medium of the vessel; and
   a filtering unit accommodated in the vessel and having an upstream side and a downstream side, the upstream side of the filtering unit being in fluid communication with the reactor and the downstream side of the filtering unit being in fluid communication with the syngas outlet;
   wherein the filtering unit is provided with one or more filter elements, each filter element comprising a porous support element, the porous support element comprising a porous outer wall element and a porous inner wall element, the wall elements being spaced apart from each other and defining a free space between the wall elements, wherein the filter elements comprise a particulate catalytically active metal material in bulk accommodated within the free space;

the method comprising feeding the feedstock material into the feedstock inlet of the vessel of the apparatus;

feeding a gaseous gasifying medium into the apparatus via the gasifying medium inlet;

reacting the feedstock material and the gasifying medium in the gasifying reactor accommodated in the apparatus to produce a crude syngas;

passing the crude syngas directly through the filtering unit accommodated in the vessel and promoting catalytic reforming of organic compounds contained in the crude syngas by the catalytically active metal material in the filtering unit to provide a purified syngas; and, removing the purified syngas from the vessel through the syngas outlet thereof.

2. The method of claim 1, wherein said catalytically active metal material is deposited on basic metal oxide material or mixed metal oxide material.

3. The method of claim 1, wherein said metal material comprises one or more metals selected from Ni, Fe, Ru, Pd, Pt, Rh, Ir and Re in elemental or oxide form.

4. The method of claim 1, wherein the inlet for sorbent material is in fluid communication with the upstream side of the filtering unit.

5. The method as defined in claim 1, wherein said gasifying medium is a combustion supporting gas.

6. The method as defined in claim 1, wherein said feedstock material is in the form of a particulate matter.

7. The method as defined in claim 1, wherein said feedstock material includes cellulose containing material.

8. The method as defined in claim 1, wherein said feedstock comprises dried sewage sludge.

9. The method as defined in claim 1, wherein said gasifying medium is fed into said vessel through said gasifying medium inlet, said inlet being located in a bottom portion and/or a side wall of the vessel.

10. The method as defined in claim 9, wherein said feedstock material is fed into said vessel through said feedstock inlet, said feedstock inlet being located in said side wall.

11. The method as defined in claim 9, wherein said purified syngas is removed from said vessel through said syngas outlet, said syngas outlet being located in an upper end portion of the vessel.

12. The method as defined in claim 1, including promoting decomposition of ammonia.

13. The method as defined in claim 1, wherein said method comprises feeding a sorbent material into the reactor.

14. The method as defined in claim 13, wherein said sorbent material is fed into the reactor together with the feedstock material.

15. The method as defined in claim 13, wherein said sorbent material is fed into the vessel on the upstream side of the filtering unit.

16. The method as defined in claim 13, wherein said sorbent material is selected to bind $H_2S$, HCl, heavy metals and/or alkaline compounds.

17. The method as defined in claim 16, wherein said sorbent material includes dolomite, lime and/or trona.

18. The method of claim 13, wherein the method comprises continuously feeding the feedstock material into the reactor.

19. The method of claim 18, wherein the reactor includes a fluidized bed comprising particulate matter selected from sand, olivine and/or dolomite, and the method includes accelerating heating of the feedstock material to a desired reaction temperature.

20. The method as defined in claim 1, wherein during said passing the crude syngas through the filtering unit an ash component of said crude syngas is removed therefrom.

21. The method as defined in claim 20, wherein the ash component removed from the syngas is directly returned into the reactor.

22. The method as defined in claim 1, said method being carried out as a continuous method.

23. The method as defined in claim 1, wherein said method includes withdrawing exhausted particulate feedstock material from said reactor.

24. The method of claim 1, wherein, in feeding the gaseous gasifying medium into the apparatus via the gasifying medium inlet, water vapour alone is the gasifying medium.

25. The method of claim 1, wherein the method comprises continuously feeding the feedstock material into the reactor.

26. The method of claim 25, wherein the reactor includes a fluidized bed comprising particulate matter selected from sand, olivine and/or dolomite, and the method includes accelerating heating of the feedstock material to a desired reaction temperature.

27. The method of claim 1, wherein feeding the gasifying medium into the apparatus comprises feeding the gasifying medium into one or more gasifying inlets located at a bottom and/or side wall of the vessel.

\* \* \* \* \*